(12) United States Patent
Hatambeiki et al.

(10) Patent No.: US 8,788,857 B2
(45) Date of Patent: Jul. 22, 2014

(54) SYSTEM AND METHOD FOR PROVIDING A LOW POWER REMOTE CONTROL

(75) Inventors: Arsham Hatambeiki, Irvine, CA (US); Christopher Lee Sommerville, Los Angeles, CA (US); Weidong William Wang, Tustin, CA (US)

(73) Assignee: Universal Electronics Inc., Santa Ana, CA (US)

( * ) Notice: Subject to any disclaimer, the term of this patent is extended or adjusted under 35 U.S.C. 154(b) by 148 days.

(21) Appl. No.: 13/028,664

(22) Filed: Feb. 16, 2011

(65) Prior Publication Data

US 2012/0066528 A1    Mar. 15, 2012

Related U.S. Application Data

(60) Provisional application No. 61/381,108, filed on Sep. 9, 2010.

(51) Int. Cl.
 *G06F 1/32* (2006.01)
(52) U.S. Cl.
 USPC ............................ 713/321; 713/323; 713/330
(58) Field of Classification Search
 USPC .......................................................... 713/321
 See application file for complete search history.

(56) References Cited

U.S. PATENT DOCUMENTS

| | | | |
|---|---|---|---|
| 4,959,810 A | 9/1990 | Darbee et al. | |
| 5,455,570 A | 10/1995 | Cook et al. | |
| 7,046,185 B2 | 5/2006 | Griesau et al. | |
| 7,154,428 B2 | 12/2006 | de Clercq et al. | |
| 7,873,849 B2* | 1/2011 | Mucignat et al. | 713/323 |
| 8,234,512 B2* | 7/2012 | Mucignat et al. | 713/323 |
| 8,255,009 B2* | 8/2012 | Sorensen et al. | 455/572 |
| 2005/0078087 A1 | 4/2005 | Gates et al. | |
| 2008/0020753 A1 | 1/2008 | Glass et al. | |
| 2008/0098426 A1 | 4/2008 | Candelore | |
| 2010/0194358 A1* | 8/2010 | Stanford-Clark | 323/234 |
| 2011/0093729 A1* | 4/2011 | Mucignat et al. | 713/323 |

OTHER PUBLICATIONS

Brenner, Neal; "Ultra-Low Power TV IR Remote Control Transmitter"; Texas Instruments; Application Report SLLA175; Oct. 2005; all pages.*
International Bureau of WIPO, International Preliminary Report on Patentability of PCT Appln. No. US2011/45464, mailed on Mar. 21, 2013, 6 pages.

* cited by examiner

*Primary Examiner* — Ryan Stiglic
(74) *Attorney, Agent, or Firm* — Greenberg Truarig, LLP (57) ABSTRACT

To conserve power in a controlling device having a processing device in communication with an input element and a transmitting device the processing device is caused to be placed into a low-power state for at least a portion of a transmission inactive interval intermediate the transmission of at least a pair of command frames. The command frames are caused to be transmitted by the transmitting device in response to an activation of the input element sensed via the processing device to thereby command a functional operation of an intended target device.

12 Claims, 5 Drawing Sheets

SYSTEM AND METHOD FOR PROVIDING A LOW POWER REMOTE CONTROL

RELATED APPLICATION DATA

This application claims the benefit of U.S. Provisional Application Ser. No. 61/381,108 filed on Sep. 9, 2010, which application is incorporated herein by reference in its entirety.

BACKGROUND

Controlling devices, for example remote controls, for use in issuing commands to entertainment and other appliances, and the features and functionality provided by such controlling devices are well known in the art. Such controlling devices may be universal, that is, capable of controlling multiple appliance types of different manufacture; unified, that is, capable of controlling multiple appliance types of the same manufacture; or dedicated, that is, capable only of controlling a single appliance of a specific manufacture. Descriptions of such controlling devices may be found, for example, in U.S. Pat. Nos. 4,959,810, 5,455,570, 7,046,185, or 7,154,428. The majority of such devices are hand held and battery powered. It is advantageous to maximize battery life in these devices in order to reduce the expense, inconvenience and environmental impact associated with periodic replacement of disposable batteries, or, in the case of rechargeable devices, to improve operational time between rechargings. To this end, various technical advances in battery chemistry, semiconductor technology, transmission protocol design, etc. have been adopted by the designers and manufacturers of such controlling devices.

SUMMARY OF THE INVENTION

This invention relates generally to methods for prolonging battery life in portable controlling devices, and in particular to the reduction of energy consumption during the transmission of command functions to controlled appliances. A majority of such controlling devices use some type of microcontroller to manage the formatting and transmission of command data, typically activated in response to a key press by a user of the device. In prior art embodiments, such a microcontroller may remain active and consuming power during the entire duration of said key press, even though the resulting command output may comprise the transmission of a series of data blocks or frames interleaved with periods of inactivity. As will become apparent from the description of an exemplary embodiment hereafter, the methods of the instant invention realize a reduction in overall energy consumption by placing the microcontroller into a low-power state during such inactive periods, i.e., between successive command data frame transmissions.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
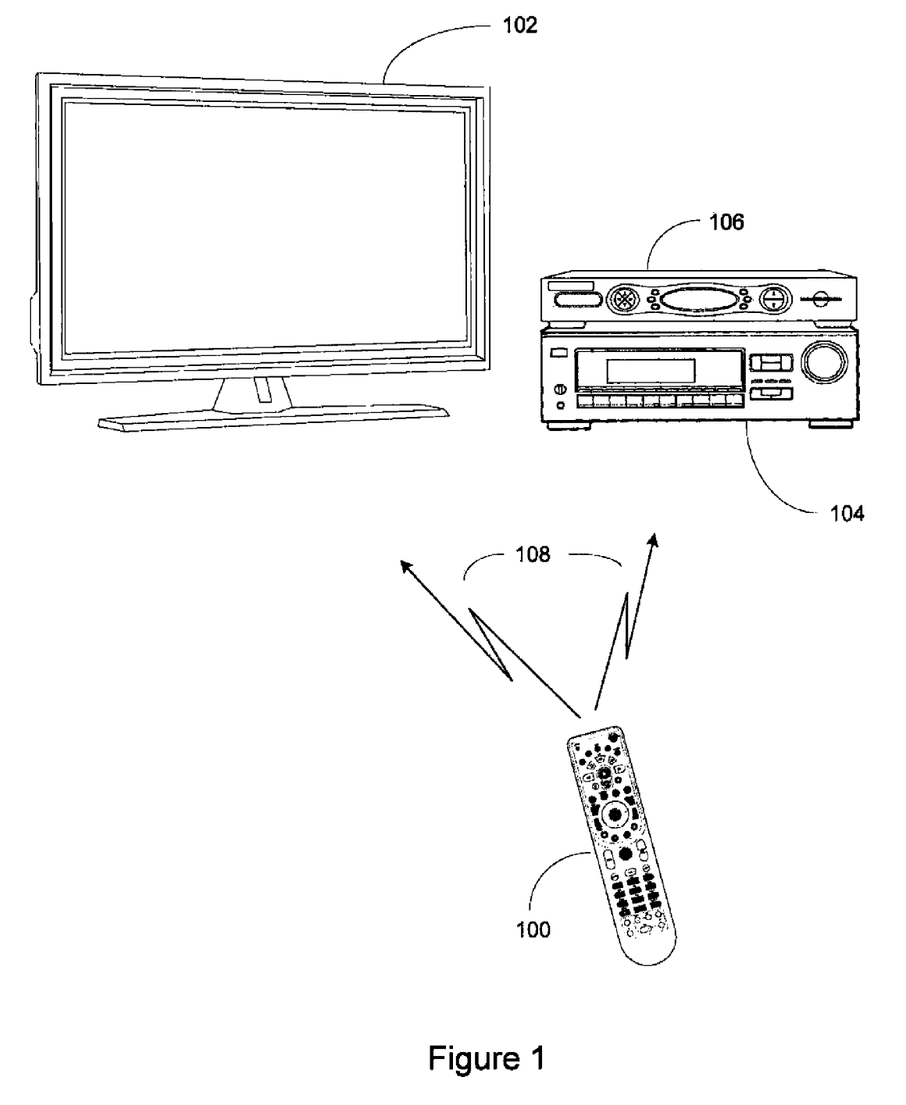
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as a television 102, an AV receiver 104 and a set top box ("STB") 106. As is known in the art, the controlling device 100 is capable of transmitting commands to the appliances, using any convenient IR, RF, Point-to-Point, or networked protocol 108, to cause the appliances to perform operational functions. While illustrated in the context of a television 102, AV receiver 104, and STB 106, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc.

Figure 2:
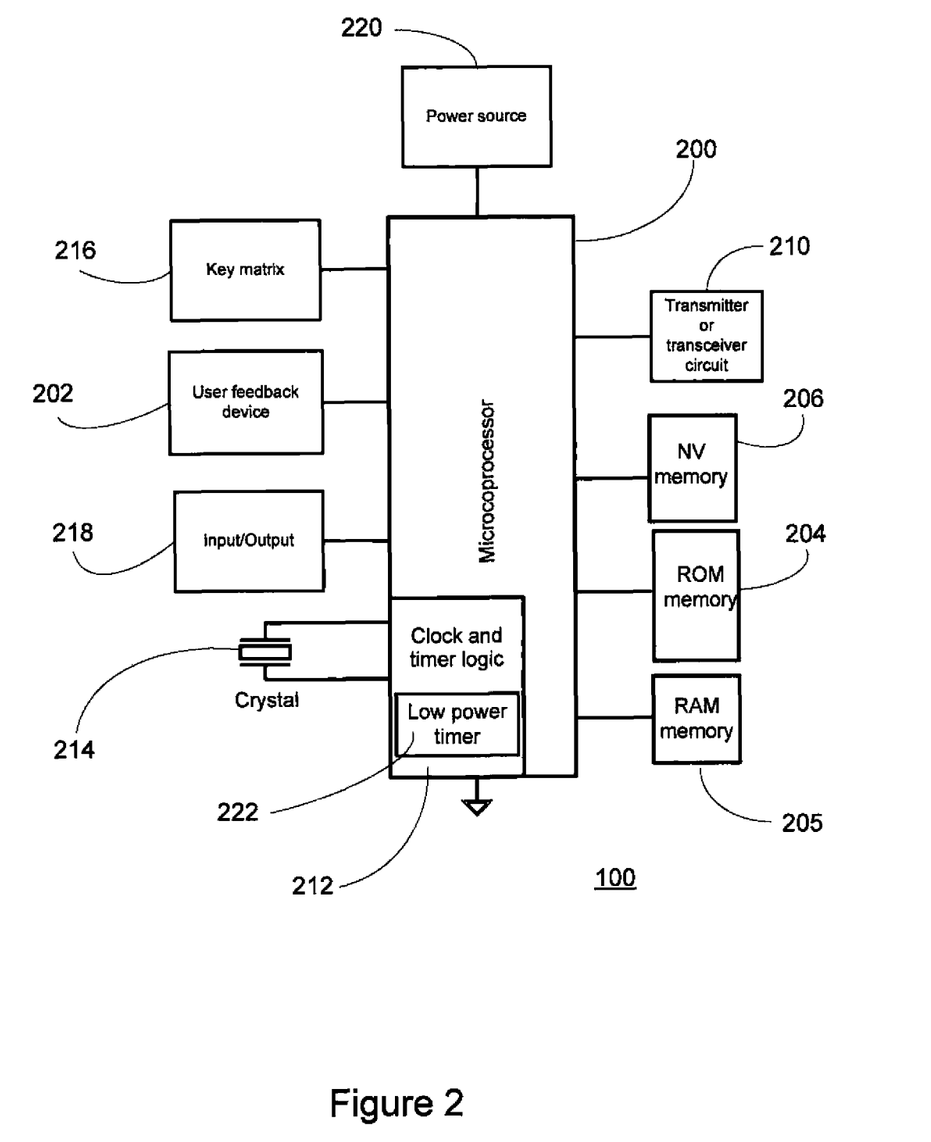
FIG. 2 illustrates a block diagram of exemplary components of the exemplary controlling device of FIG. 1.

With reference to FIG. 2, for use in commanding the functional operations of one or more appliances, the controlling device 100 may include, as needed for a particular application, a processor 200 coupled to a ROM memory 204, a RAM memory 205, a key matrix 216 (e.g., hard keys, soft keys such as a touch sensitive surface overlaid on a liquid crystal (LCD), and/or an electroluminescent (EL) display), transmission circuit(s) and/or transceiver circuit(s) 210 (e.g., IR and/or RF), a non-volatile read/write memory 206, a means 202 to provide feedback to the user (e.g., one or more LEDs, illuminable keys, display, speaker, and/or the like), an input/output port 218 such as a serial interface, USB port, modem, Zigbee, WiFi, or Bluetooth transceiver, etc., a power source 220 such as a battery, and clock and timer logic 212 with associated crystal or resonator 214 and a low power timing device 222 such as, for example, a nanopower ring oscillator as may be found in the MAXQ610 microprocessor available from Maxim Integrated Products, Inc.

As will be understood by those skilled in the art, some or all of the memories 204, 205, 206 may include executable instructions (collectively, the controlling device program memory) that are intended to be executed by the processor 200 to control the operation of the controlling device 100, as well as data which serves to define the necessary control protocols and command values for use in transmitting command signals to controllable appliances (collectively, the command data). In this manner, the processor 200 may be programmed to control the various electronic components within the controlling device 100, e.g., to monitor the key matrix 216, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the memories 204, 205 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, etc. In response to an event, appropriate instructions within the program memory (hereafter the "controlling device operating program") may be executed. For example, when a command function key is actuated on the controlling device 100, the controlling device 100 may retrieve from the command data stored in memory 204, 205, 206 a command value and control protocol corresponding to the actuated function key and, where necessary, current device mode and transmit that command to an intended target appliance, e.g., STB 106, in a format recognizable by that appliance to thereby control one or more functional operations of that appliance. It will be appreciated that the controlling device operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

In some embodiments, controlling device 100 may be of the universal type, that is provisioned with a library comprising a multiplicity of command codes and protocols suitable for controlling various appliances. In such cases, for selecting sets of command data to be associated with the specific appliances to be controlled (hereafter referred to as a setup procedure), data may be entered into the controlling device 100 that serves to identify each intended target appliance by its make, and/or model, and/or type. The data may typically be entered via activation of those keys that are also used to cause the transmission of commands to an appliance. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code (obtained, for example, from a printed list of manufacturer names and/or models with corresponding code numbers, from a support Web site, etc.). Alternative setup procedures known in the art include scanning bar codes, sequentially transmitting a predetermined command in different formats until a target appliance response is detected, interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 or to pending U.S. patent application Ser. No. 11/515,962, all of like assignee and incorporated herein by reference in their entirety.

As is known in the art, microcontroller 200 may be placed into a quiescent or "stop" mode by the controlling device operating software. When in such a state, the current drawn from power source 220 may be substantially reduced. By way of example, the aforementioned MAXQ610 microcontroller may draw a nominal 3.75 mA when active (running at a full clock speed of 12 MHz, as determined by crystal 214) but only 0.2 µA when in stop mode, i.e. power consumption is reduced by a factor of almost 20,000 when the microcontroller is placed into stop mode. Resumption of processor activity from such a stop mode may be triggered by an external event such as for example user actuation of key matrix 216, a change in state of input/output port 218, etc., and in the case of the exemplary MAXQ610 and similar parts also by an internal event initiated by a low-speed, low-power, interval timer 222 which may be configured to continue running while the main microcontroller CPU is in stop mode. Such low-power interval timers typically operate at a much lower speed than the primary microprocessor clock, via a secondary crystal or resonator or, as in the case of the exemplary MAXQ610, an internal ring oscillator. By way of example, the MAXQ610 internal "nanopower" ring oscillator operates at a nominal 8 KHz (as contrasted to the primary clock rate of 12 MHz) and consumes only a nominal 40 nA.

As required by a particular microcontroller application, such low-power interval timers may be used to maintain a time-of-day clock; to provide periodic wake-ups to monitor an RF or IR receiver as described for example in U.S. Pat. No. 5,638,050 "System For Locating An Object"; to implement a backlight time-out, etc.; or as disclosed hereafter in an exemplary embodiment of the instant invention, to enable reduced energy consumption during transmission of appliance commands by a controlling device.

Figure 3:
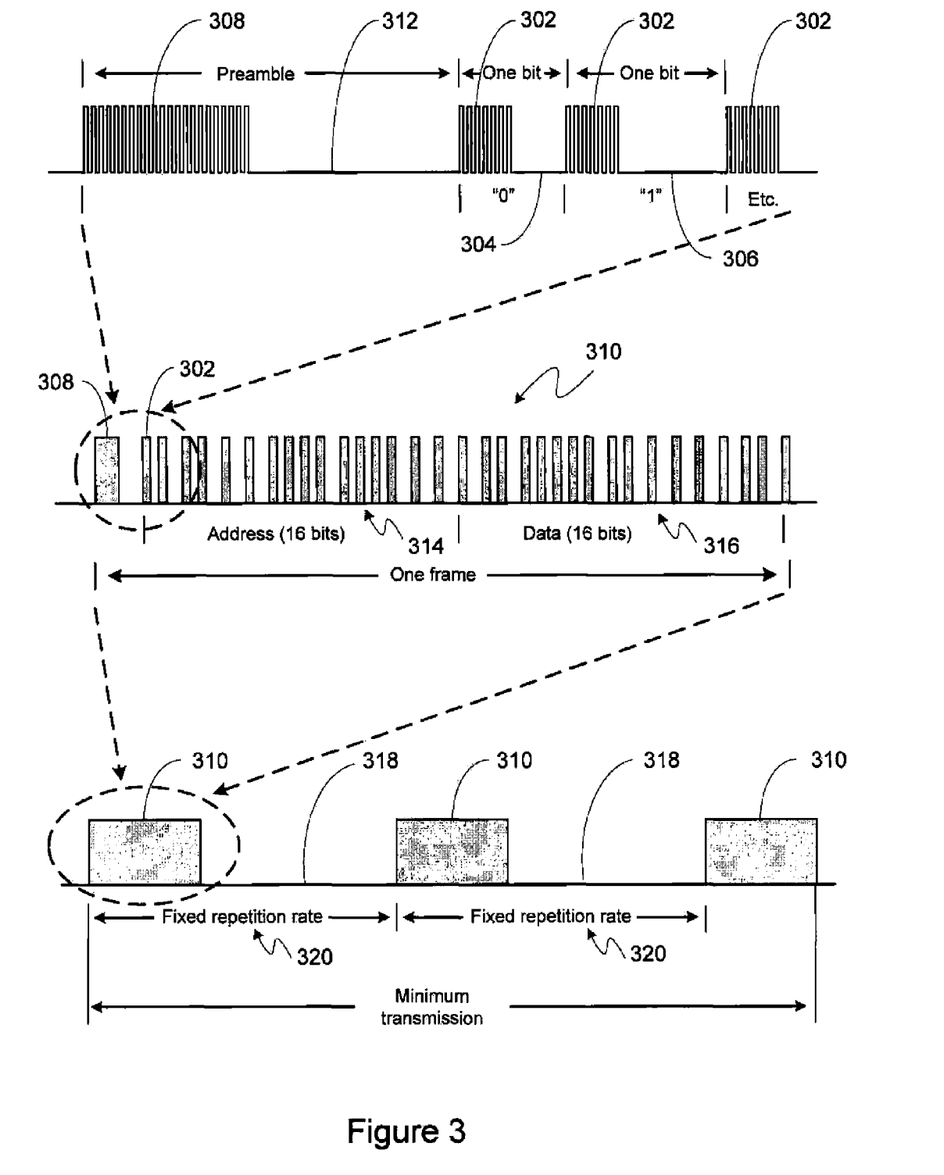
FIG. 3 illustrates an exemplary command transmission format which may be used in the system of FIG. 1.

FIG. 3 illustrates the format of an exemplary appliance command transmission such as might be initiated by controlling device 100 in response to user activation of a key of key matrix 216. In response to such a key activation, the controlling device operating program may retrieve from the command data stored in memories 204,205,206 an appropriate command value and transmission protocol. In accordance with the retrieved protocol definition, the data comprising the exemplary command may be encoded for transmission as a stream of pulses 302 of a carrier frequency, for example a 38 KHz signal, to be used to drive an IR emitter, e.g. 210, thereby producing a command transmission output. In the particular example presented, data bits are encoded using a form of pulse position modulation (PPM), i.e. the pulses of carrier frequency 302 are of a fixed duration and the data bit values are represented by variation in the pauses 304, 306 between pulses. As will be appreciated, other forms of bit encoding are also possible, by way of example without limitation, pulse width modulation (PWM), Manchester (or "bi-phase") modulation, frequency shift keying (FSK), etc.

Applying the above described encoding technique, data corresponding to a single appliance command function may be formatted into a command transmission frame 310 comprising in the example illustrated, a preamble or start signal consisting of a unique header pulse 308 and gap 312 (which combination serves to signal the start of a frame) followed by 32 bits of PPM encoded data. In the example presented, these 32 bits further comprise 16 bits of address 314 (which may for example indicate the manufacturer and/or appliance type to which the command is directed) and 16 bits of command information 316 which may indicate the desired action. Other data lengths and/or bit allocations are of course possible as required by various appliances or applications. As is common in such protocols, the command protocol illustrated further requires that transmission frames be repeated at fixed intervals 320 for as long as the corresponding command key of controlling device 100 continues to be depressed by a user, or for a minimum number of repeats (three in the illustrative example), whichever is greater. As is evident from the illustration, a complete command transmission sequence may thus comprise a number of bursts of transmission activity interspersed with periods of inactivity.

It will be appreciated a multiplicity of such appliance command transmission protocols and formats exist and may be used equal effectively with their respective target appliances and as such the illustrative example of FIG. 3 is intended only to assist in better understanding of the power saving techniques described hereafter, and not as an exhaustive definition of the genre. Since such other command protocols and formats are well known the art, for the sake of brevity these will not be discussed further herein. Nevertheless, for further information regarding appliance command protocols the interested reader may refer, for example, to publications such as *Digipoints*, Volume III, Issue 4, 'Remote Controls" published by the Society of Cable and Telecommunication Engineers, July 1999 (downloadable at www address scte.org/documents/pdf/Issue%203-04.pdf.) or to *Sample Infrared Code Formats* published by Celadon Inc. (downloadable at www address celadon.com/infrared_protocol/infrared_protocols_samples.pdf).

Figure 4A:
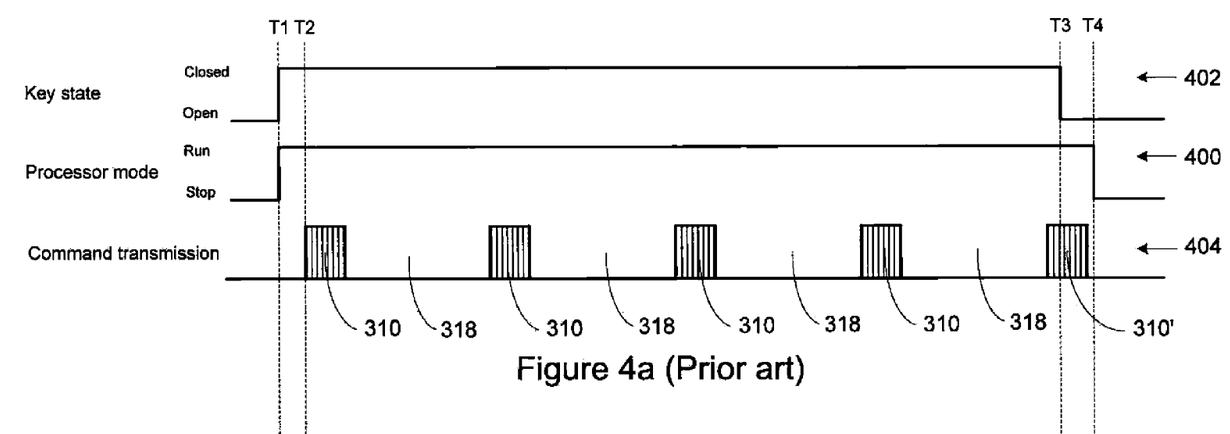
FIG. 4a illustrates an example of controlling device microcontroller activity during a user key press according to the prior art.

Turning now to FIG. 4a, the operating state 400 of a prior art controlling device microcontroller is illustrated in relation to the timing of a key activation 402 and the resulting command transmission 404. Prior to activation of a key, the microcontroller may be in a low power quiescent or "stop" mode as described earlier. Activation of a key at time T1 triggers a resumption of microcontroller activity and causes the controlling device operating program to scan the key matrix to determine which key was depressed, perform debounce processing on said key, and thereafter retrieve from stored command data the appropriate command value and transmission protocol corresponding to that key, all as well known in the art, after which at time T2 repetitive transmission of command frames 310 commences, for example as previously described in conjunction with FIG. 3. Upon release of the key at time T3, upon completion of any currently-transmitting frame 310' the controlling device operating program may detect this status and thereafter, at time T4, place the microcontroller back into stop mode to await the next event. Of note is that the microcontroller remains operational at full clock speed for at least the entire keypress duration T1-T4.

Figure 4B:
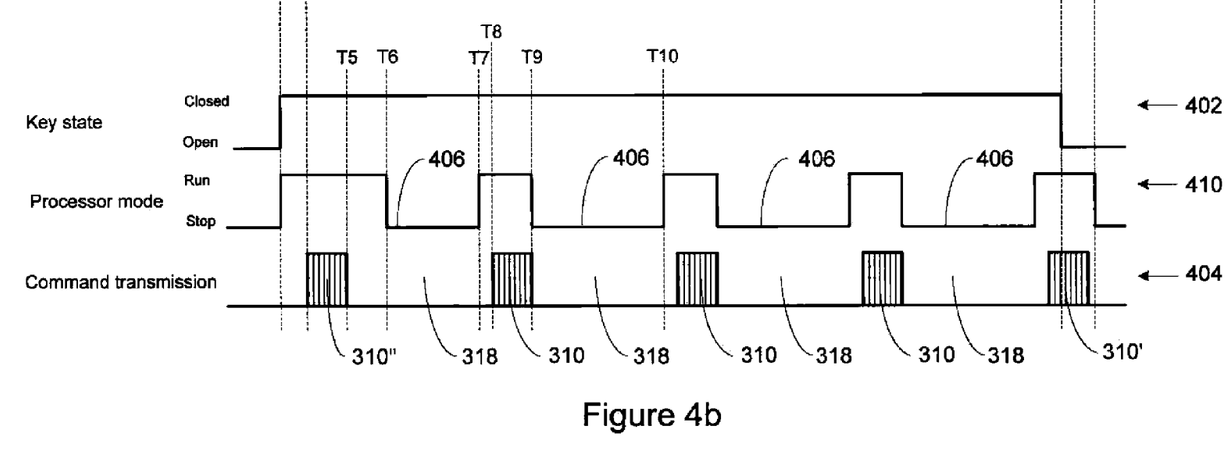
FIG. 4b illustrates an example of reduced controlling device microcontroller activity during a user key press according to the instant invention.

With reference to FIG. 4b, the operating state 410 of a controlling device constructed in accordance with the teachings of the instant invention will now be discussed in the same context. The behavior of microcontroller 100 and its associated controlling device operating program during time T1-T2 and transmission of the initial command frame 310" remains as described above in conjunction with FIG. 4a. However, upon completion of initial command frame transmission at time T5, the controlling device operating program may place microcontroller 200 into a low-power "stop" mode state 406 for a portion of the transmission inactive interval 318 as illustrated for example at time T6-T7, and thereafter at each subsequent inactive interval 318, as illustrated for example at time T9-T10. A more detailed description of the activities of the controlling device operating program in this regard will now be presented in conjunction with the flowchart of FIG. 5.

Figure 5:
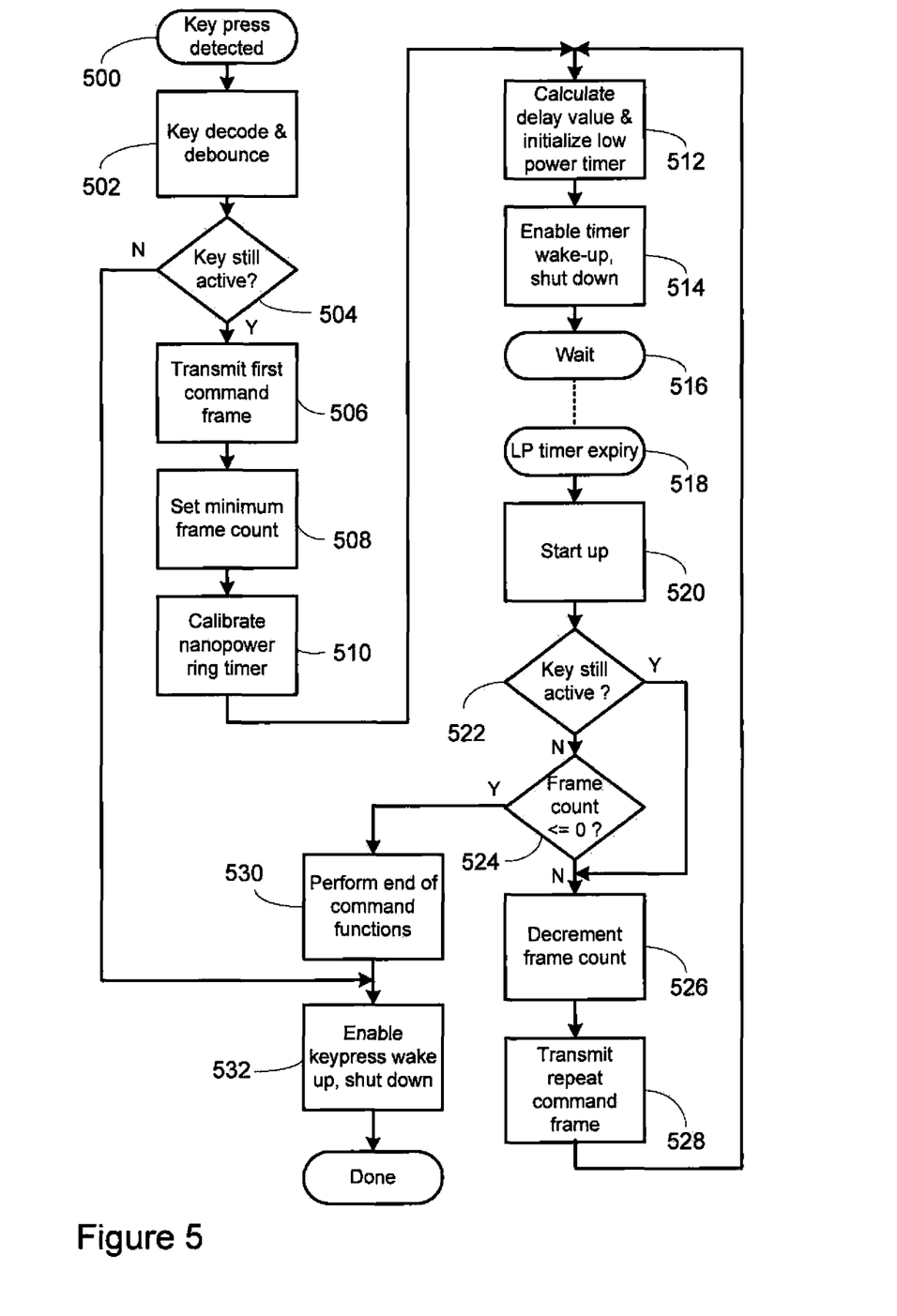
FIG. 5 illustrates in flow chart form an exemplary method corresponding to the microcontroller active times illustrated in FIG. 4b.

With reference to FIG. 5, when actuation of a key of key matrix 216 is detected at step 500 (corresponding to time T1 of FIG. 4b) the operating program of controlling device 100 at step 502 may ascertain the location of the specific actuated key and retrieve from the command data stored in memories 204,205,206 an appropriate command value and transmission protocol as required to issue the appliance command currently associated with that key location. Step 502 may also comprise a key debounce period (as well known in the art) and performance of any housekeeping routines necessary to prepare microcontroller 200 and associated transmitter 210 for transmission of an appliance command according to the retrieved protocol, for example that illustrated in FIG. 3. Upon completion of this processing, at step 504 a final check is performed to verify that the key which initiated these actions is still actuated. If not, the controlling device operating program may proceed to shut down step 532. If, however, the key remains actuated, the controlling device is now committed (at time T2 of FIG. 4b) to transmit at least the protocol-specified minimum number of command frames. At step 506 the initial command frame, e.g. 310", is transmitted as illustrated in FIGS. 3 and 4b. Upon completion of this initial frame (corresponding to time T5 of FIG. 4b), at step 508 the controlling device operating software may initialize a minimum frame counter to the value required by the particular protocol in use, for example "3" if using the protocol illustrated in FIG. 3. Thereafter at step 510 the controlling device operating software may calibrate the low-power timer feature 222 of microcontroller 200.

By way of explanation, in microcontroller systems which utilize a secondary low speed crystal as clock source for a low-power timer, the exact clock rate of the input to that timer is known and this step may be omitted. However, in microcontroller systems such as the exemplary MAXQ601 which utilize an internal gate-based clock such as a ring oscillator, the exact clock speed is dependent on factors such as temperature and supply voltage. Accordingly, calibration of the low-power clock via, for example, a comparison against the crystal-controlled main system clock may be necessary in order to accurately determine desired counter initialization values for the low-power timer. In the illustrative embodiment presented herein, this calibration may be performed only once during each complete command transmission, i.e., at the end of initial frame 310". It will however be appreciated that in other embodiments this procedure may be performed more frequently, for example multiple times within a single interframe period and/or after every transmitted frame, or less frequently, for example based on elapsed time, measured supply voltage, etc., as appropriate. In this context it will be appreciated that in certain embodiments, batteries which are approaching depletion may result in a deterioration of supply voltage over the course of a single command transmission—and in particular, may be dependent in part on the duration of a user key press—in which instances it may be desirable to perform multiple calibrations during a single command transmission sequence in order to continuously maintain a desired accuracy of the low-power timer system. Accordingly, the calibration step of the exemplary embodiment presented herein is intended to be illustrative, and not limiting.

Once calibration is complete, at step 512 the low power timer 222 may be initialized to a value representing a desired power-saving processor "stop" period (corresponding to time T6-T7 of FIG. 4b) during the remainder of the protocol-determined inactive interval 318. As will be appreciated, the exact duration of inactive interval 318 and, thus, the remaining portion thereof, may be dependent on the particular command protocol and/or data values currently being transmitted and may need to be calculated afresh each time step 512 is executed. For example, in the case of a universal controlling device, the protocol and timings to be used may be dependent on the particular device type, brand and/or model that the controlling device is presently configured to command. Further, certain bit encoding schemes (such as the illustrative example presented in FIG. 3) may result in a data frame 310 of variable length according to the particular mix of binary ones and zeros in the specific command data being encoded, thus necessitating a variable length inactive period 318 in order to achieve a fixed repetition rate 320. Finally, an allowance may need to be made for wake-up processing (i.e., a value corresponding to time period T7-T8 of FIG. 4b). Once the desired "stop" period has been calculated in this manner, the result may be converted into an appropriate low-power timer count value based on the previously-performed calibration procedure and then loaded into low-power timer 222. Thereafter, at step 514 the controlling device operating software may enable timer wake-up, start low power timer 222 count-down, and place microcontroller 200 into quiescent, or "stop", mode. At step 516 (corresponding to time T6 of FIG. 4b) the microcontroller may enter said stop mode.

Upon expiry of the low-power timer at step 518 (corresponding to time T7 of FIG. 4b), at step 520 microcontroller 200 is restarted and at step 522 the controlling device operating software may determine if the key which initiated the command transmission is still actuated. If not, at step 524 the controlling device operating software may next determine if the protocol-specified minimum transmitted frame count has been reached. If either the key remains actuated or the minimum frame count has not been reached, then at step 526 the frame counter is decremented and at step 528 a further command frame 310 is transmitted, commencing at time T8 of FIG. 4b. Upon completion of frame transmission, the controlling device operating software returns to step 512 to once again calculate a desired "stop" time and initiate a stop-wake sequence, it being noted that the stop time calculation and low-power timer initialization value required may differ for these second and subsequent iterations. For example, in the exemplary embodiment the desired stop time may comprise a longer duration (T9-T10 in FIG. 4b) since no further calibration procedure is performed. Additionally, though not the case in the illustrative protocol of FIG. 3, certain appliance command protocol schemes may define second and subsequent transmitted frames which differ from the initial frame in length and/or data content, thereby affecting the calculation of desired "stop" time.

Once the key which initiated the command transmission is determined to be no longer active and the minimum frame count has been satisfied, at step 530 the controlling device operating software may perform any end of command housekeeping functions required. For example, though not required by the illustrative protocol of FIG. 3, certain command protocols may require transmission of a unique "end of transmission" or "key up" frame. Thereafter, at step 532 the key press wake up interrupt is enabled and the microcontroller returned to quiescent, or "stop", mode to await the next event.

In this manner, battery power utilization during transmission of an appliance command by a controlling device may be further optimized over the prior art.

While various concepts have been described in detail, it will be appreciated by those skilled in the art that various modifications and alternatives to those concepts could be developed in light of the overall teachings of the disclosure. For example, it will be appreciated that the operations of the illustrative embodiment of FIGS. 4 and 5 need not necessarily be performed in the exact sequence presented in order to achieve the results described herein: for example, calculation of a desired "stop" period and/or a low power timer calibration may be performed prior to, rather than subsequent to, transmission of command frame(s); "stop" periods may be pre-calculated and stored as part of the command data library; timer calibration may be performed as part of a factory test or a device initialization procedure; etc., as appropriate for a particular implementation. Further, in certain embodiments a low power timer may be used for other purposes in addition to those described above, for example periodic key matrix scanning, checking for activity on a communication link, etc., in which cases it will be appreciated that calibration of such a timer may be performed in conjunction with such other activities, not necessarily as part of command transmission processing. Additionally, while the exemplary embodiment presented above describes an appliance command protocol which utilizes infrared light as a transmission medium, it will be appreciated that the power saving techniques described herein may be beneficially applied to alternate embodiments using other transmission media such as RF, ultrasonic, wired, etc. Further, while the illustrative transmission comprises an appliance command resulting from a key press on a controlling device, it will be appreciated that these power saving techniques may also be applied to other activities, for example automated command transmission sequences (sometimes known in the art as "macros"), data transfers, equipment status reporting, etc., as appropriate for a particular embodiment.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation.

Accordingly, it will be appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for conserving power in a controlling device having a processing device in communication with an input element and a transmitting device, comprising:

in response to an activation of the input element sensed via the processing device, causing the transmitting device to transmit at least two command frames to thereby command a functional operation of an intended target device; and causing the processing device to be transitioned from an active-power state into a low-power state for an amount of time which occurs during and which is no longer than a transmission inactive interval intermediate the transmission of the at least two command frames;

wherein the amount of time the processing device is caused to be placed into the low-power state is adjustable by the controlling device.

2. The method as recited in claim 1, wherein the controlling device adjusts the amount of time the processing device is caused to be placed into the low-power state as a function of data values to be transmitted in the at least two command frames.

3. The method as recited in claim 1, wherein the controlling device adjusts the amount of time the processing device is caused to be placed into the low-power state as a function of a command protocol to be used to transmit the at least two command frames.

4. The method as recited in claim 1, wherein the controlling device adjusts the amount of time the processing device is caused to be placed into the low-power state as a function of an encoding scheme to be used to transmit the at least two command frames.

5. The method as recited in claim 1, wherein the controlling device adjusts the amount of time the processing device is caused to be placed into the low-power state prior to the transmission of at least a first one of the at least two command frames.

6. The method as recited in claim 1, wherein the controlling device adjusts the amount of time the processing device is caused to be placed into the low-power state subsequent to the transmission of at least a first one of the at least two command frames.

7. The method as recited in claim 1, wherein the controlling device adjusts the amount of time the processing device is caused to be placed into the low-power state prior to the transmission of each of the at least two command frames.

8. The method as recited in claim 1, wherein the controlling device adjusts the amount of time the processing device is caused to be placed into the low-power state subsequent to the transmission of each of the at least two command frames.

9. The method as recited in claim 1, comprising using a low-power timer to measure the amount of time the processing device is caused to be placed into the low-power state.

10. The method as recited in claim 9, comprising using a comparison of a clock speed of a main system clock versus a clock speed of a low-power clock to calibrate the low-power timer used to measure the amount of time the processing device is caused to be placed into the low-power state.

11. The method as recited in claim 9, comprising using a procedure to calibrate the low-power timer.

12. The method as recited in claim 11, wherein the procedure to be calibrate the low-power timer is used multiple times during the transmission inactive interval intermediate the transmission of the at least two command frames.

* * * * *